United States Patent [19]

Frank, deceased et al.

[11] Patent Number: 4,857,670
[45] Date of Patent: Aug. 15, 1989

[54] WIRING DUCT UNIT

[76] Inventors: Richard E. Frank, deceased, late of Bayside, Wis.; by Pat P. Frank, heir, 740 E. Bay Point Rd., Bayside, Wis. 53217

[21] Appl. No.: 149,409

[22] Filed: Jan. 28, 1988

[51] Int. Cl.⁴ .......................... H02G 3/04; H02G 3/06
[52] U.S. Cl. .................... 174/68.3; 138/166; 174/71 R; 174/101
[58] Field of Search ............... 174/48, 49, 68.3, 70 C, 174/71 R, 72 C, 97, 101; 52/287; 138/92, 155, 156, 166

[56] References Cited

U.S. PATENT DOCUMENTS

| | | | |
|---|---|---|---|
| 3,786,171 | 1/1974 | Shira | 174/97 X |
| 4,391,303 | 7/1983 | Holgersson | 174/101 X |
| 4,602,124 | 7/1986 | Santucci | 174/72 C X |
| 4,649,376 | 3/1987 | Frank | 340/693 X |

FOREIGN PATENT DOCUMENTS

| | | | |
|---|---|---|---|
| 25369 | 8/1972 | Australia | 174/101 |
| 2448240 | 8/1980 | France | 174/97 |
| 216521 | 10/1967 | Sweden | 174/97 |
| 484540 | 2/1970 | Switzerland | 174/48 |
| 1021871 | 3/1966 | United Kingdom | 174/101 |

Primary Examiner—Laramie E. Askin

[57] ABSTRACT

A wiring enclosure is formed as an elongated extended plastic extrusion having a rectangular cross section. The enclosure includes a U-shaped base with a cover connected by a thin flexible hinge portion. The outer edge of the cover has a depending lip releasably mating with a corresponding shaped locking recess. A pair of locking walls are integrally formed on the interior of the opposite sidewalls of the base and project inwardly to define a locking channel with the bottom wall. A locking tab is pressed into locking channels and releasably interconnects enclosures. Mounting elements are secured to the bottom wall. Alternatively, other securements can be used such as adhesive pads, Velcro attachment units or the like.

11 Claims, 2 Drawing Sheets

WIRING DUCT UNIT

BACKGROUND OF THE PRESENT INVENTION

This invention relates to a wiring duct unit and particularly to such a unit for wiring in a building structure.

Electric wiring of building structures for distribution of electric power generally requires specially insulated wires and/or passing of the insulated wires through a suitable protective conduit. The wiring system is generally enclosed within the wall structure between suitable outlet and power connections. In the addition and revising of the wiring systems within a structure, it is advantageous to permit the wall mounting of the wires in order to avoid the necessity for passing the wires through the wall structures. However, the wiring is then exposed. In many instances, the conventional wiring is not esthetically acceptable. In addition, the exposed wiring may not meet code requirements established by various governmental agencies. A typical example of an insulation where an external wall mounted wiring system may be desirable is the installation of computer terminals, in-house telephone systems, lighting units, additional outlets and smoke alarms in a building structure. Various computer systems which are widely used in building structures require low voltage wiring interconnecting the several components of the system. For example, a centralized computer system requires linking of CRT terminals at various work stations to a computer main frame, located elsewhere in the building. In such applications, low voltage wiring is often run along the walls of the building between the several components. The wiring system may have to extend around corner portions of the various wall structures. Generally, the wiring is advantageously, if not required by code, to be mounted within a suitable protective enclosure.

Various prior art patents have disclosed wall mounted enclosures. The enclosures are generally constructed as elongated tubular members having an outer releasable cover to permit access for the application and servicing of the wires within the enclosure.

Although various wall mounted wiring enclosures have been suggested and various forms are commercially available, the systems are generally relatively expensive and/or present some difficulty with respect to application. Further, enclosures of a less costly variety are not particularly adapted to application within a building structure where the esthetic appearance is of significance such as a home, office building and the like.

There is therefore a continuing need and demand for a wiring enclosure which can be provided at a reasonable cost and which permits the convenient and ready application to the interior of the structure. The device should of course provide an esthetically pleasing enclosure for those special applications.

SUMMARY OF THE PRESENT INVENTION

The present invention is particularly directed to a wiring enclosure which is adapted to be mounted to the interior wall of a building structure in a rapid and convenient manner, with minimal skill and with a pleasing appearance. The structure of the present invention provides a reliable and effective enclosure of the wires while permitting convenient access to the wiring for installation, servicing and maintenance. The unit further provides an esthetically pleasing and readily mounted wiring enclosure.

In accordance with this invention, an extruded plastic housing is provided having a snap cover structure. The unit includes a special internal channel construction permitting the interconnection of adjacent members by a simple removable tab. Such a molded plastic channel provides a simple, readily applied and relatively low cost wiring unit to permit low cost manufacture and installation.

More particularly in accordance with a preferred construction of the present invention, the wiring enclosure is formed as a relatively rigid plastic and formed as a continuous extruded elongated member. The enclosure is preferably formed with a rectangular cross section including a generally U-shaped base member with a pivotally attached integral cover. The cover is integrally formed to one sidewall of the U-shaped base member by a relatively thin connecting portion permitting convenient flexing of the cover relative to the U-shaped base member. The outer edge of the cover is formed with a depending lip adapted to mate with a correspondingly shaped recess or locking channel formed on the interior of the base member. In addition, the interior of the wiring enclosure is formed with a pair of locking members or walls integrally formed on the interior of the opposite sidewalls of the base. The walls project inwardly generally in alignment with each other and define a locking channel with the bottom wall of the U-shaped base. The elongated plastic members are readily formed with means for mounting to the interior wall structure. For example, the base of the units can be provided with based openings and/or weakened portions which can be removed to form openings. Suitable screws or other attachment members can then be applied through the opening to secure the channel to the wall structure. Alternatively, other securements can be used such as adhesive pads, Velcro attachment units or the like. The plastic enclosure is readily cut to the desired lengths and configurations using simple cutting tools such as saws or other sharp instruments. The enclosure can be arranged in the various configurations with an esthetic interconnection of various electrical devices and to accommodate the various intersecting wall structures along which the wiring must be attached.

In accordance with a further aspect of the invention, the intersecting enclosures are formed with complementing end walls. A locking tab is then inserted between the two members extending into the locking channels provided by the spaced locking walls. The tab can be inserted with a pressed fit to firmly but releasably interconnect the various abutting duct enclosure elements. Obviously if a permanent installation is desired, suitable adhesive or other locking means can interconnect the tab and the enclosure elements.

The present invention provides an enclosure which is readily formed as an elongated member for subsequent custom installation. The unit is readily commercially formed with known technology and materials and can therefore be formed with acceptable cost figures. The unit is particularly adapted to the application with minimal amount of skill and using readily available tools. The final product can be very esthetically pleasing and readily adapted for application in exposed areas where such considerations are of significance.

DESCRIPTION OF THE DRAWING FIGURES

The accompanying drawings illustrate the best mode that was contemplated by the inventor for carrying out the invention.

DESCRIPTION OF THE ILLUSTRATED EMBODIMENT

Figure 1:
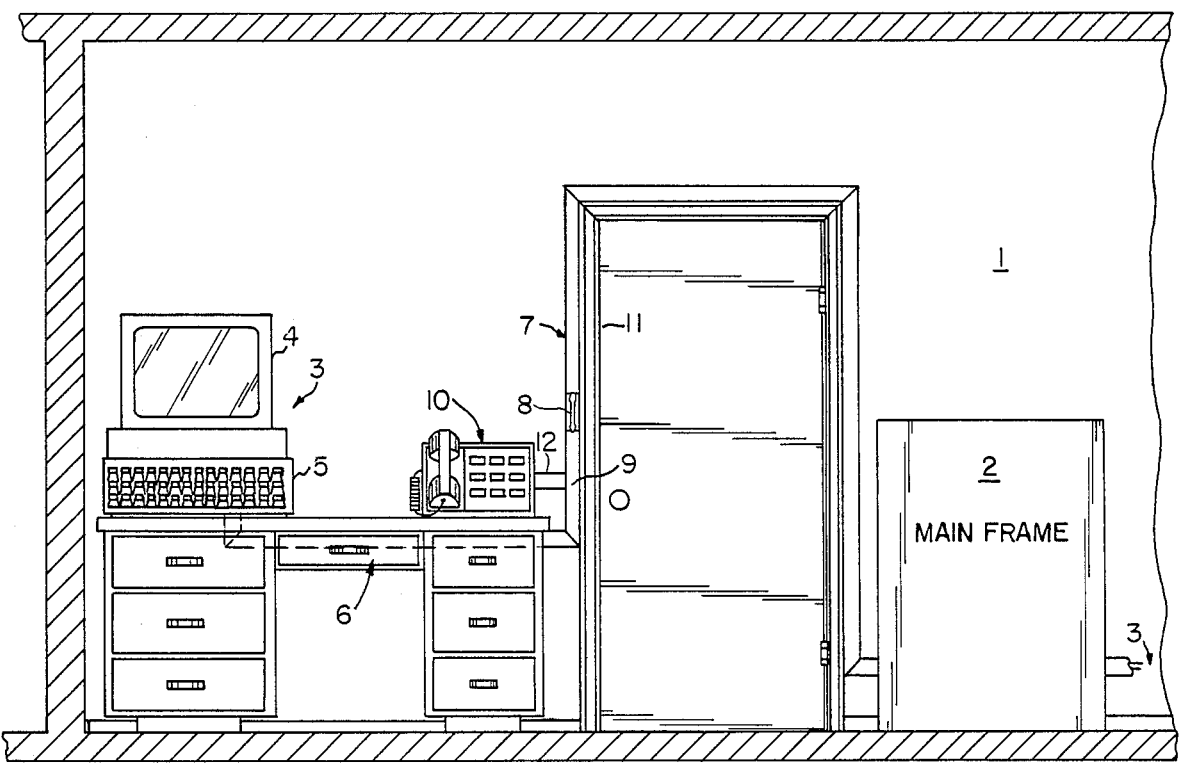
FIG. 1 is a front elevation illustration of an application of the present invention.

Referring to the drawings and particularly to FIG. 1, a centralized computer system is shown located in the building structure 1. The computer system includes a main frame computer 2 connected to a plurality of computer terminals 3 located at various work stations throughout the building structure 1. In the illustrated embodiment of the invention, a single terminal 3 is shown, although the system may include hundreds of such terminals. Generally, each terminal 3 includes a monitor 4 and associated keyboard unit 5 suitably mounted at a computer table 6.

All the terminals 3 are connected to the main frame unit 2 by similar low voltage wiring cable units 7 including connecting wires 8 located within a wiring enclosure 9, constructed in accordance with the present invention. Communication between the main frame unit 2 and the terminals 3 is established over low voltage circuits including the connecting wires 8.

The cable units 7 are generally surface mounted to the walls of the building structure 1 between the several components of the computer system as such as well as peripheral equipment such as telephone 10. The cable unit 7 is shown extending along the walls of the room and around a doorway 11 to the mainframe. The telephone 10 is connected by a similar cable unit 12 to the cable unit 7 for interfacing the telephone system as shown with the computer or guiding the telephone line to a phone jack or other system.

The computer system is shown as a typical installation for use of the special wiring cable unit 7. The system can be any known or suitable construction, and no further description is necessary or given herein other than as necessary to describe the illustrated embodiment of the invention.

A practical and novel wiring enclosure 9 is illustrated in the drawings and particularly in FIGS. 2–5. The enclosure 9 is formed as insulating conduit 49, preferably as a single piece extruded plastic member. The low voltage wires 8 are housed within the plastic conduit 49 to protect the wires from accidental or intentional destruction. The single piece conduit is shown with a generally rectangular configuration for convenient wall mounting, either by suitable mounting screws, a suitable adhesive or other suitable elements interposed between the unit and the wall.

The conduit 49 is formed with a U-shaped channel base 50 and an outer movable wall cover 51 integrally formed with one sidewall 51a of base 50 as by a thinned hinged joint unit 52. The conduit 49 and cover 51 in a preferred structure are formed as an integral extruded plastic, such as a polyvinyl chloride, including a rigid plastic for the body and cover and a flexible plastic for the hinge joint unit 52. The above type of extrusion to form a product is generally known in the extrusion art as a duodurometer extrusion. In the illustrated embodiment, an adhesive pad 52a is secured to the back of the base wall 50 for securing the conduit 49 to the wall or other suitable support. The free edge of the wall cover 51 and the mating edge of the opposite sidewall 51b is formed as a slot and tab connector. In the illustrated embodiment, the edge of the cover 51 includes a depending tab 53 adapted to releasably snap into edge recess or slot 54 in the sidewall, as shown in phantom in FIG. 2. Thus, the outer entrance to the slot 54 and the inner end of the tab 53 have slight curved enlargements to establish a firm but releasable connection. The inner base wall 54a of the channel base 50 is further formed with a ledge 55 on the hinged wall to define a slot 56 extending throughout the length of the conduit 49. The inner wall 55b for the cover recess 54 is spaced from the conduit base to form a second slot 57 similar to and aligned with slot 56. A coupling tab 58 in the form of a flat strip is constructed to provide a pressure fit within the slots 56–57. The tab 58 bridges the joint between abutting channels to form a firm interconnection therebetween.

Figure 5:
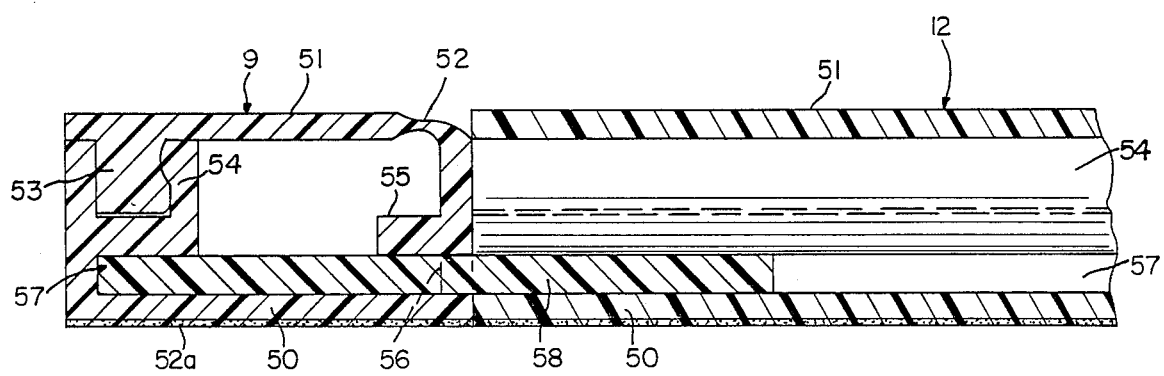
FIG. 5 is a cross-section taken on line 5—5 of FIG. 4.
Figure 2:
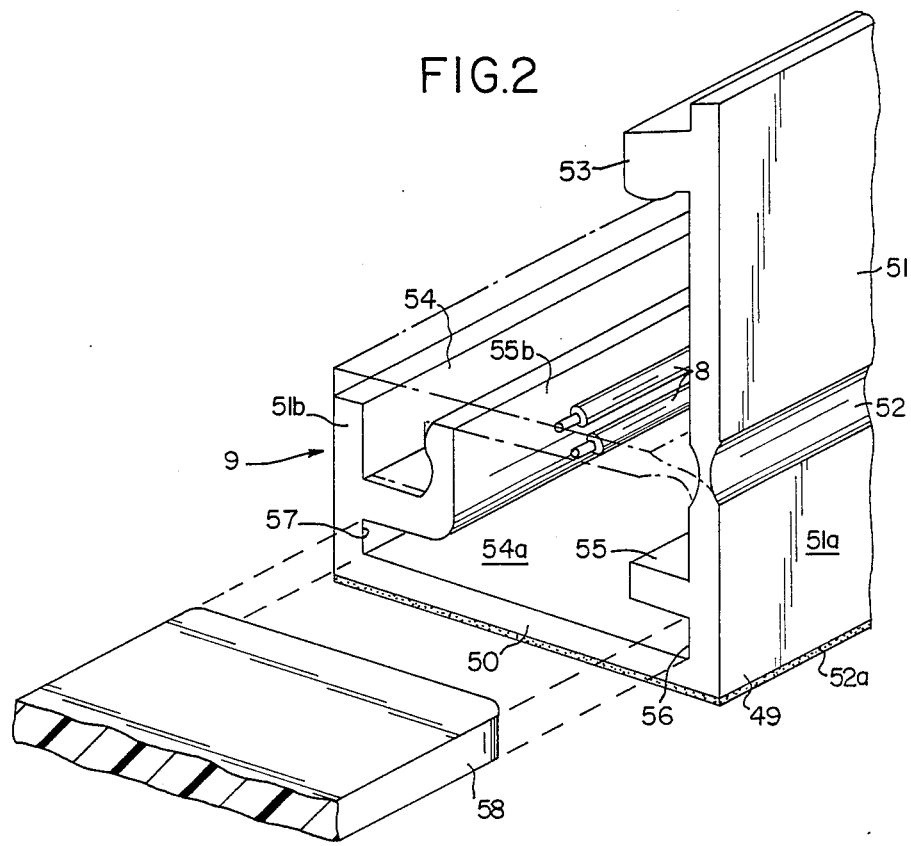
FIG. 2 is an exploded pictorial view of a protective cable enclosure shown in FIG. 1.

In practice, the conduit can be made of a standard length. In assembly of the wiring of the system, the conduits are formed with abutting joints at various connections, such as end-to-end lengths and corners. The end-to-end connection of conduit is made by tab 58 projecting into the abutting conduits. As shown in FIG. 5, a side joint or T-connection is similarly made with a tab 58 projecting from the end of one conduit into the side of the adjacent conduit and through the conduit into slots 56 and 57. The enclosure 9 may be formed with longitudinally spaced die cut portions for forming the tab openings. The tab opening is aligned with cable unit 12 and cut to proper length for connection into the system. The tab 58 is inserted into the one conduit, which is then attached to the other by insertion of the tab as shown in FIG. 5.

Figure 3:
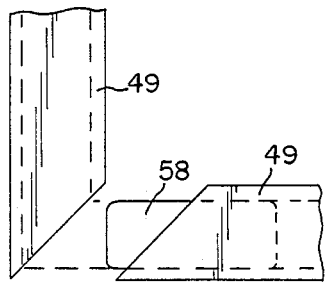
FIG. 3 is a plan view showing a corner connection of the cable enclosure.
Figure 4:
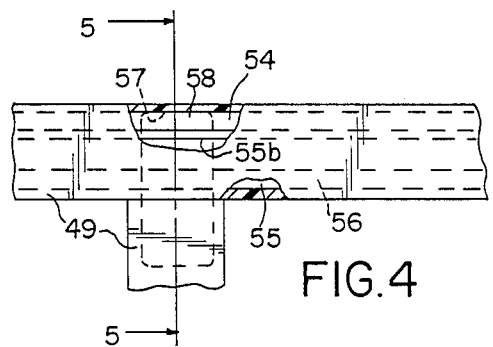
FIG. 4 is a plan view, partially in section, showing a T-connection of the cable enclosure.

As shown in FIG. 3, a corner connection is made by forming the conduits with a 45 degree angle, or other appropriate angle and with a tab 58 again bridging the connection. A series of conduits are mounted in abutting relationship for all necessary wiring of the main frame to the various computer terminals.

The wiring duct system shown is particularly useful for home or commercial installation and suitable for any other low current and voltage wiring.

The present invention thus provides a significant improvement in the art of wall mounted wiring systems and the like, and in the preferred aspects of the invention, particularly adapted for commercial installation.

Various modes of carrying out the invention are contemplated as being within the scope of the following claims particularly pointing out and distinctly claiming the subject matter which is regarded as the invention.

What is claimed is:

1. An elongated wiring duct-like enclosure for surface mounting of electrical wiring to a support structure, comprising a base member having a first sidewall and a second sidewall joined by a bottom wall and said sidewalls having substantially aligned outer ends, a cover integrally connected to the outer end of said first sidewall, said cover having an outer edge, said base member including its sidewalls and bottom wall being formed of plastic, the outer edge of said cover adapted to mate with the outer end of said second sidewall, said cover and said second sidewall having a releasable connection means for releasably securing of said cover to said second sidewall, and means for securing said base member to a support structure with said cover located in spaced relation to said support structure for movement of the cover between a closed position and an open position, a first locking wall secured to said first sidewall and projecting toward said second sidewall in spaced relation to said bottom wall, a second locking wall secured to said second sidewall and projecting partially inwardly toward said first sidewall in substantial alignment with said first locking wall, said first and second locking walls being aligned and defining a locking slot for receiving a locking tab for interconnection of similar abutting enclosures.

2. The elongated wiring duct-like enclosure of claim 1 wherein said base member is an extruded plastic member of a substantially rectangular cross-section, said cover is integrally molded with said first sidewall and connected thereto by an integral hinge portion permitting manual pivoting of the cover relative to said sidewalls.

3. The elongated wiring duct-like enclosure of claim 2 wherein said hinge portion and cover and base member are an integral duodurometer extruded assembly and wherein said hinge portion is formed of a flexible plastic, and said cover and said base member are formed of a rigid plastic.

4. The elongated wiring duct-like enclosure of claim 1 wherein said releasable connection means includes a latching wall secured to said second sidewall and defining a latching recess extending along the length of said second sidewall, said cover having a latching projection of a cross section substantially complementing said latching recess and located to mate with said latching recess with the cover pivoted downwardly into abutting engagement with said second sidewall.

5. The elongated wiring duct-like enclosure of claim 1 including a second base member corresponding in structure to said first-named base member and having an opening in the lower portion of one of its spaced sidewalls, said first-named base member having an end abutting said second base member at said opening, and a locking tab extending between said first and second base members and into at least one of said locking slots.

6. The elongated wiring duct-like enclosure of claim 1 wherein a second base member corresponding in structure to said first-named base member is joined at one end to an end of the first-named base member with said ends abutting, said ends of said base members being formed with mating angled surfaces to define an angled conduit, and a locking tab extends between said abutting ends and into locking engagement with said locking slots in said base members.

7. The elongated wiring duct-like enclosure of claim 1 wherein said enclosure is formed of an extruded plastic.

8. The elongated wiring duct-like enclosure of claim 1 wherein said base member is rectangular in cross-section and said first and second spaced sidewalls and said bottom wall are each a flat wall of the same thickness, said cover being of the same thickness as said bottom wall and connected to said first sidewall by a thin integral portion defining a hinge.

9. A wiring enclosure for enclosing wires extended along the surfaces of a housing structure, comprising an extruded plastic conduit member of a substantially rectangular cross-section, said conduit member having a substantially rigid U-shaped base including a flat mounting wall and first and second outwardly extending parallel sidewalls integrally formed with said mounting wall, a cover integrally molded with said first sidewall and connected thereto by a thin integral hinge portion having a thickness significantly less than the thickness of said cover and said first sidewall, said thin hinge portion permitting manual pivoting of the cover relative to said sidewalls, a latching wall secured to said second sidewall and defining a latching recess extending along the length of said second sidewall, said cover having a latching projection of a cross-section substantially complementing said latching recess and located to mate with said latching recess with the cover pivoted downwardly into abutting engagement with said second sidewall, said latching wall being spaced from the mounting wall of said base, a locking wall secured to the interior of said first sidewall and projecting partially inwardly into said U-shaped base in outwardly spaced relation to the mounting wall, said latching wall and said locking wall defining a locking slot for receiving a locking tab for interconnection of similar abutting enclosures.

10. The wiring enclosure of claim 9 wherein said latching recess is formed with a slightly narrow entrance opening adjacent the outer edge of said second sidewall, said latching projection on said cover having an outer portion slightly larger than said entrance opening to provide a releasable friction latch of said cover to said second sidewall.

11. The wiring enclosure of claim 9 wherein said enclosure is formed of polyvinyl chloride plastic.

* * * * *